United States Patent [19]

Lupyan et al.

[11] Patent Number: 5,470,500
[45] Date of Patent: Nov. 28, 1995

[54] COMPOSITION FOR CLEANING AND WATERPROOFING A SUBSTRATE AND INHIBITING THE BUILD-UP OF STATIC ELECTRICITY ON SAID SUBSTRATE

[75] Inventors: David A. Lupyan, Chagrin Falls; Bryan I. Sokol, Westlake, both of Ohio

[73] Assignee: Blue Coral, Inc., Cleveland, Ohio

[21] Appl. No.: 179,435

[22] Filed: Jan. 10, 1994

[51] Int. Cl.$^6$ ............................ C11D 3/26; C11D 1/835; C09K 3/16

[52] U.S. Cl. .................. 252/174.15; 252/174.21; 252/174.22; 252/173; 252/547; 252/389.1; 252/DIG. 3; 252/DIG. 14; 252/DIG. 15; 252/DIG. 1; 252/DIG. 7

[58] Field of Search ................ 252/174.15, 173, 252/174.21, 174.22, 389.1, 547, DIG. 1, DIG. 3, DIG. 14, DIG. 15, DIG. 7

[56] References Cited

U.S. PATENT DOCUMENTS

| | | | |
|---|---|---|---|
| 4,005,028 | 1/1977 | Heckert et al. | 252/99 |
| 4,022,928 | 5/1977 | Piwcyzk | 427/43 |
| 4,795,783 | 1/1989 | Hunt | 525/101 |
| 4,898,682 | 2/1990 | Dekura | 252/47.5 |
| 4,921,629 | 5/1990 | Malihi et al. | 252/170 |
| 5,225,190 | 7/1993 | Halloran et al. | 424/70 |
| 5,326,557 | 7/1994 | Glover et al. | 424/78.03 |

Primary Examiner—Paul Lieberman
Assistant Examiner—Lorna M. Douyon
Attorney, Agent, or Firm—Renner, Otto, Boisselle & Sklar

[57] ABSTRACT

This invention relates to a composition and method for cleaning and waterproofing a substrate and inhibiting the build-up of static electricity on said substrate. The inventive composition comprises: water; a detergent amount of at least one nonionic surfactant; an anti-static amount of at least one amphoteric surfactant; and a waterproofing amount of at least one organofunctional silane. The inventive method involves the steps of: (A) applying a first sample of the inventive composition to the substrate being treated and cleaning the substrate with the first sample; (B) removing the first sample from the substrate; (C) coating the substrate with a second sample of the inventive composition; and (D) drying the second sample on the substrate.

9 Claims, No Drawings

COMPOSITION FOR CLEANING AND WATERPROOFING A SUBSTRATE AND INHIBITING THE BUILD-UP OF STATIC ELECTRICITY ON SAID SUBSTRATE

TECHNICAL FIELD

This invention relates to cleaning compositions and methods of cleaning and, more particularly, to cleaning compositions and methods of cleaning wherein the substrate that is cleaned is also waterproofed and the build-up of static electricity on such substrate is inhibited. The inventive composition and method are particularly suitable for treating the wheels of automobiles, trucks, and the like.

BACKGROUND OF THE INVENTION

Traditional wheel cleaning products are solutions of surfactant and/or acid-based formulations which are simply sprayed onto the wheel and wiped, thereby cleaning the surface. A problem that has persisted in the art is that these traditional products do not offer any protection against aggressive liquids (e.g., acid rain, road tar, asphalt, oil, etc.) and the subsequent deposit of brake dust and other miscellaneous dust particles which build-up due to static electricity. The inventive composition and method provide a solution to this problem.

SUMMARY OF THE INVENTION

This invention relates to a composition and method for cleaning and waterproofing a substrate and inhibiting the build-up of static electricity on said substrate. The inventive composition comprises: water; a detergent amount of at least one nonionic surfactant; an anti-static amount of at least one amphoteric surfactant; and a waterproofing amount of at least one organofunctional silane. The inventive method involves the steps of: (A) applying a first sample of the inventive composition to the substrate being treated and cleaning the substrate with the first sample; (B) removing the first sample from the substrate; (C) coating the substrate with a second sample of the inventive composition; and (D) drying the second sample on the substrate.

DESCRIPTION OF THE PREFERRED EMBODIMENT

The nonionic surfactants that are useful can be any nonionic surfactant that has cleaning or detergency properties in water-based compositions. Many nonionic surfactants are known. See, for example, McCutcheon's "Emulsifiers & Detergents," 1992, North American Edition pp. 1–209 and 266–272; these pages being incorporated herein by reference. See, also, the treatise "Non-Ionic Surfactants" edited by Martin J. Schick, M. Dekker Co., New York, 1967, which is incorporated herein by reference for its disclosures in this regard. Among the nonionic surfactant types are the alkylene oxide-treated products, such as ethylene oxide-treated phenols, alcohols, esters, amines and amides. Ethylene oxide/propylene oxide block copolymers are useful nonionic surfactants. Glycerol esters and sugar esters are also known to be nonionic surfactants.

In one embodiment the nonionic surfactants that are useful are compounds represented by the formula $$R^1O-(R^2O)_n-H \quad \text{(I)}$$

wherein in Formula I, $R^1$ is a hydrocarbon group, $R^2$ is an alkylene group, and n is a number that is preferably in the range of about 1 to about 40. In one embodiment $R^1$ is a hydrocarbon group, preferably a linear aliphatic hydrocarbon group, of preferably 1 to about 100 carbon atoms, more preferably 1 to about 40 carbon atoms, more preferably about 4 to about 30 carbon atoms, more preferably about 8 to about 20 carbon atoms. $R^2$ is an alkylene group of preferably 1 to about 4 carbon atoms, more preferably about 2 or about 3 carbon atoms, and in one embodiment about 2 carbon atoms. In one embodiment n is a number ranging from 1 to about 30, preferably 1 to about 20, more preferably 1 to about 15, more preferably about 2 to about 12, more preferably about 4 to about 8. In one embodiment the nonionic surfactant is a $C_4$ to $C_{24}$, preferably $C_8$ to $C_{18}$, more preferably $C_{12}$ to $C_{14}$, linear alcohol ethoxylate. An example of a commercially available nonionic surfactant is Neodol 23–6.5, which is a product of Shell Chemical Co. identified as being a $C_{12}$–$C_{13}$ linear primary alcohol ethoxylate.

The nonionic surfactants are present in the inventive compositions in sufficient amounts to provide such compositions with enhanced detergency or cleaning properties. In one embodiment the nonionic surfactants are present in the inventive compositions at concentrations in the range of about 0.1% to about 40% by weight, preferably about 1% to about 15% by weight, more preferably about 1% to about 8% by weight, more preferably about 2% to about 4% by weight.

The amphoteric surfactants can be any surface-active agent that carries both a positive and a negative charge and functions as an anti-static agent in waterbased compositions. Many amphoteric surfactants are known. See, for example, the above-noted publication, McCutcheon's "Emulsifiers and Detergents," pp. 1–209 and 273–274, which are incorporated herein by reference. The amphoteric surfactants identified as antistats in McCutcheon's "Functional Materials," 1992, North American Edition, pp. 20–25, can be used, these pages being incorporated herein by reference.

In one embodiment the amphoteric surfactant can be represented by the formula

(II)

wherein in Formula II, $R^1$, $R^2$ and $R^3$ are independently hydrogen or hydrocarbon groups, $R^4$ is an alkylene group, and X is $SO_3^-$ or $COO^-$. $R^1$, $R^2$ and $R^3$ can be independently hydrocarbon carbon groups of preferably 1 to about 50 carbon atoms, more preferably 1 to about 30 carbon atoms, more preferably 1 to about 20 carbon atoms. $R^4$ is preferably an alkylene group of 1 to about 10 carbon atoms, and in one embodiment 1 to about 4 carbon atoms. In one embodiment $R^1$ and $R^3$ are aliphatic hydrocarbon groups of 1 to 10 carbon atoms, preferably 1 to about 3 carbon atoms; $R^2$ is a fatty acid derivative of about 4 to abut 28 carbon atoms; $R^4$ is an alkylene group of about 1 to about 10 carbon atoms, preferably 1 to about 4 carbon atoms; and $X^-$ is $SO^3$ or $COO^-$, preferably $SO_3^-$. An example of a commercially available amphoteric surfactant that is useful is Larostat 264 which is a product of PPG Industries identified as a modified soya dimethylethyl ammonium etho sulfate.

Mixtures of two or more of the foregoing amphoteric surfactants can be used. The amphoteric surfactants are present in the inventive compositions in amounts sufficient to reduce the static electricity of the substrate to which such compositions are applied. In one embodiment the amphoteric surfactants are present in the inventive compositions at concentrations in the range of about 0.01% to about 30% by weight, preferably about 0.05% to about 10% by weight, more preferably about 0.1% to about 5% by weight, more preferably about 0.1% to about 1% by weight, and in one embodiment about 0.1% to about 0.5% by weight.

The organofunctional silane can be any silane that enhances the waterproofing characteristics of the inventive compositions. In one embodiment the organofunctional silane is represented by the formula $$R^1_{4-n}SiX_n \tag{III}$$

wherein in Formula III, $R^1$ is a functionally substituted hydrocarbon group, the functional substituent of said functionally substituted hydrocarbon group being amino, hydroxy, halo, mercapto, alkoxy, acyl, or epoxy; X is a hydrolyzable group, such as alkoxy (e.g., methoxy, ethoxy, etc.), or halogen (e.g., chlorine); and n is 1, 2 or 3, and preferably n is 3. These silanes include halosilanes, aminoalkoxysilanes, aminophenylsilanes, phenylsilanes, heterocyclic silanes, N-heterocyclic silanes, acrylic silanes, mercapto silanes, and mixtures of two or more thereof.

In one embodiment the organofunctional silane is a compound represented by the formula $$Y-(CH_2)_n-SiX_3 \tag{IV}$$

wherein in Formula IV, Y is an organofunctional group selected from the group consisting of $$-Cl, -NH_2, -SH, -CH=CH_2, -O-\underset{\underset{O}{\|}}{C}-C(CH_3)=CH_2,$$

$$-N=C=O, \text{ and } CH_2-\overset{O}{\overset{\diagup\diagdown}{CH}}-;$$

X is a silicon-functional group selected from the group consisting of —Cl, —OCH₃, —OC₂H₅ and —OC₂H₄OCH₃; and n is a number in the range of 1 to about 100, preferably 1 to about 50, more preferably 1 to about 30.

Examples of useful organofunctional silanes include methoxy functional amino silsesquioxane, octadecyl amino dimethyl trimethoxy silylpropyl ammonium chloride, N-(2-aminoethyl)-3-aminopropyl trimethoxysilane; 3-(N-styrylmethyl-2-aminoethylamino)propyl trimethoxysilane; 3-aminopropyl triethoxysilane; bis(2-hydroxyethyl)-3-aminopropyltriethoxysilane; β-(3,4-epoxy cyclohexyl)ethyl trimethoxysilane; 3-glycidoxypropyl trimethoxysilane; 3-methacryloxypropyl trimethoxysilane; 3-chloropropyl trimethoxysilane; vinyl trichlorosilane; vinyl triethoxysilane; and vinyl-tris(2-methoxyethoxy)silane.

An example of a commercially available organofunctional silane that can be used is Dow Corning 1-6248 which is a product of Dow Corning identified as a mixture containing 75% by weight methoxy functional amino silsesquioxane, 18% by weight octadecyl amino dimethyl trimethoxy silylpropyl ammonium chloride, 4% by weight chloropropyl trimethoxy silane, and 3% by weight methyl alcohol.

Mixtures of two or more of any of the foregoing organofunctional silanes can be used. The organofunctional silanes are present in the inventive compositions in sufficient amounts to enhance the waterproofing characteristics of such compositions. In one embodiment the organofunctional silanes are present in the inventive compositions at concentrations in the range of about 0.01% to about 10% by weight, preferably about 0.1% to about 5% by weight, more preferably about 1% to about 3% by weight.

In one embodiment the inventive composition includes an effective amount of at least one alcohol to enhance the rate of evaporation of the volatile components of said composition after the composition is applied to a substrate. The alcohol preferably has from 1 to about 5 carbon atoms, and in one embodiment from about 2 to about 4 carbon atoms. Examples include methyl alcohol, ethyl alcohol, propyl alcohol, isopropyl alcohol, butyl alcohol, isobutyl alcohol, tertiary butyl alcohol, amyl alcohol, etc. Isopropyl alcohol is a preferred alcohol. Mixtures of two or more of any of the foregoing alcohols can be used. In one embodiment the alcohol is present in the inventive composition at a concentration of up to about 40% by weight, preferably in the range of about 1% to about 15% by weight, more preferably about 1% to about 8% by weight, and in one embodiment about 2% to about 4% by weight.

In one embodiment the inventive composition includes an effective amount of at least one alkoxylated alcohol to enhance the grease cutting characteristics of said composition. These alkoxylated alcohols can be represented by the formula $$HO-R^1-OR^2 \tag{V}$$

wherein in Formula V, $R^1$ is an alkylene group of 1 to about 8 carbon atoms, preferably 1 to about 4 carbon atoms, more preferably about 2 or about 3 carbon atoms; and $R^2$ is a hydrocarbon group, preferably an aliphatic hydrocarbon group, of 1 to about 20 carbon atoms, more preferably 1 to about 10 carbon atoms, more preferably 1 to about 6 carbon atoms, and in one embodiment 1 to about 4 carbon atoms. In one embodiment the alkoxylated alcohol is 2-butoxy ethanol. Mixtures of two or more alkoxylated alcohols can be used. In one embodiment the alkoxylated alcohols are present in the inventive compositions at concentrations of about 0.1% to about 40% by weight, preferably about 1% to about 15% by weight, more preferably about 1% to about 10% by weight, and in one embodiment about 2 to about 4% by weight.

In one embodiment the inventive compositions include an effective amount of at least one corrosion inhibitor to inhibit corrosion of the substrate treated with the inventive composition. Marty useful corrosion inhibitors are known. See, for example, the above-noted publication, McCutcheon's "Functional Materials," pp. 73–84, these pages being incorporated herein by reference. The corrosion inhibitors are preferably suitable for preventing corrosion of either ferrous or non-ferrous metals (e.g., copper, bronze, brass, titanium, aluminum and the like) or both. The corrosion inhibitor can be organic or inorganic in nature, and is preferably soluble in water. Many suitable inorganic inhibitors are useful in the inventive compositions. Specific examples of useful inorganic inhibitors include alkali metal nitrites, sodium di- and tripolyphosphate, potassium and dipotassium phosphate, alkali metal borates and mixtures of the same. Specific examples of useful organic inhibitors include the perfluoro polyethers and the alkanol amines such as ethanol amine and diethanolamine. Mixtures of two or more of any of the afore-described corrosion-inhibitors can also be used. An example of a commercially available inhibitor is Fomblin which is a product of Ausimont identified as a perfluoro polyether. The corrosion inhibitor is preferably present in the inventive compositions at concentrations in which they are effective in inhibiting corrosion of the metal substrates treated with the inventive compositions. In one embodiment the corrosion inhibitors are present in the inventive compositions at concentrations up to about 10% by weight, preferably up to about 5% by weight, more preferably up to about 1% by weight, and in one embodiment from about 0.05% to about 0.2% by weight.

The inventive compositions can be provided as fully formulated products with water contents in the range of about 70% to about 99% by weight, preferably about 80% to about 95% by weight. They can also be provided in the form of concentrates wherein the ingredients other than water are provided in the same ratios to each other as with the fully formulated products but the water content is reduced for the purpose of reducing shipping costs and the like. The water content of these concentrates is preferably about 5% to about 70% by weight, more preferably in the range of about 20% to about 60% by weight.

In one embodiment, a concentrate is provided that comprises about 5% to about 70% by weight, preferably about 20% to about 60% by weight water; from about 0.2% to about 80% by weight, preferably about 2% to about 30% by weight of at least one nonionic surfactant; from about 0.02% to about 60% by weight, preferably about 0.1% to about 20% by weight of at least one amphoteric surfactant; and from about 0.02% to about 20% by weight, preferably about 0.2% to about 10% by weight of at least one organofunctional silane.

The inventive compositions are formulated by blending or mixing the foregoing ingredients together using procedures well known in the art. The order of mixing is not critical, and thus any order of mixing can be used.

In one embodiment the inventive compositions are used in aerosol systems. The inventive compositions are packaged in aerosol spray dispensers using conventional aerosol filling techniques. The propellant can be any aerosol propellant known in the art. Examples include the hydrocarbon propellants of 1 to about 5 carbon atoms, including butane, isobutane, etc.

In one embodiment the inventive composition has the following formulation:

|  | Wt. % |
|---|---|
| Neodol 23-6.5 (a product of Shell Chemical Co. identified as a $C_{12}$–$C_{13}$ linear primary alcohol ethoxylate) | 2–4% |
| Larostat 264 (a product of PPG Industries identified as modified soya dimethylethyl ammonium etho sulfate) | 0.1–0.5% |
| Dow Corning 1-6248 (a product of Dow Corning identified as a mixture of 75% methoxy functional amino silsesquioxane, 18% octadecyl amino dimethyl trimethoxy silylpropyl ammonium chloride, 4% chloropropyl trimethoxy silane, and 3% methyl alcohol) | 1–3% |
| 2-butoxy ethanol | 2–4% |
| isopropyl alcohol | 2–4% |
| Fomblin (a product of Ausimont identified as a perfluoro polyether) | 0.05–0.2% |
| Water | Remainder |

The inventive method is directed to cleaning and waterproofing a substrate and inhibiting the build-up of static electricity on the substrate. The method involves the steps of (A) applying a first sample of the inventive composition to the substrate and cleaning the substrate with the first sample; (B) removing the first sample from the substrate; (C) coating the substrate with a second sample of the inventive composition; and (D) drying the second sample of the inventive composition on the substrate. Application of the inventive composition to the substrate can be effected by any method known in the art including spraying, wiping, brushing, rolling, etc., with spraying being preferred.

In one embodiment, the inventive composition is sprayed on to an automobile or truck wheel using a heavy spray pattern. The wheel is then wiped clean using a sponge or a rag. The spray pattern is adjusted to a fine mist. The wheel is again sprayed with the inventive composition, and the composition is allowed to dry. The dried composition forms a protective coating that waterproofs the wheel. This is evident by the fact that water that is splashed or sprayed on to the protective coating beads up. This protective coating also lowers or dissipates the static charge on the surface of the wheel. By lowering or dissipating the surface charge on the wheel, the adherence of brake dust, miscellaneous dust particulates and the like to the wheel is reduced or eliminated.

The following example is provided for purposes of illustrating the invention. Unless otherwise indicated, in the following example as well as throughout the specification and claims, all parts and percentages are by weight, all temperatures are in degrees centigrade, and all pressures are atmospheric.

EXAMPLE 1

The following composition is prepared:

|  | Wt. % |
|---|---|
| Neodol 23-6.5 | 3 |
| Larostat 264 | 0.3 |
| Dow Corning 1-6248 | 2 |
| 2-butoxy ethanol | 3 |
| Isopropyl alcohol | 3 |
| Fomblin | 0.1 |
| Water | 88.6 |

Part of the above-indicated composition is sprayed on to an automobile wheel using a heavy spray pattern. The wheel is then wiped clean using a sponge. The spray pattern is adjusted to a fine mist. The wheel is then sprayed with a second part of the above-indicated composition, and the composition is allowed to dry over a period of 30 minutes at a temperature of 21° C. to provide a coating on the surface of the wheel. The coated surface is sprayed with water and the water beads up evidencing a waterproofing protection against such water. A static charge is applied to the coated surface and the surface is exposed to powdered graphite. No graphite is attracted to the coated surface. The coating on the wheel surface withstands five car washings.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition for cleaning and waterproofing a substrate and inhibiting the build up of static electricity on said substrate, said composition comprising:

water;

about 0.1% to about 40% by weight of at least one nonionic surfactant represented by the formula $$R^1O-(R^2O)_n-H \qquad (I)$$

wherein in Formula I, $R^1$ is a hydrocarbon group of 8 to about 100 carbon atoms, $R^2$ is an alkylene group of 1 to about 4 carbon atoms, and n is a number in the range of 4 to about 40;

about 0.01% to about 30% by weight of at least one amphoteric surfactant;

about 0.01% to about 10% by weight of at least one organofunctional silane represented by the formula $$R^1_{4-n}SiX_n \qquad (III)$$

wherein in Formula III, $R^1$ is a functionally-substituted hydrocarbon group, the functional substituent of said functionally-substituted hydrocarbon group being amino, hydroxy, halo, mercapto, alkoxy, acyl, or epoxy; X is a hydrolyzable group; and n is 1, 2 or 3; and about 1% to about 15% by weight of at least one alkoxylated alcohol represented by the formula $$HO-R^1-OR^2 \qquad (V)$$

wherein in Formula V, $R^1$ is an alkylene group of 1 to about 8 carbon atoms, and $R^2$ is a hydrocarbon group of 1 to about 6 carbon atoms.

2. A composition for cleaning and waterproofing a substrate and inhibiting the build up of static electricity on said substrate, said composition comprising:

water;

about 0.1% to about 40% by weight of at least one nonionic surfactant represented by the formula $$R^1O-(R^2O)_n-H \qquad (I)$$

wherein in Formula I, $R^1$ is a hydrocarbon group of 8 to about 100 carbon atoms, $R^2$ is an alkylene group of 1 to about 4 carbon atoms, and n is a number in the range of 4 to about 40;

about 0.01% to about 10% by weight of at least one organofunctional silane represented by the formula $$Y-(CH_2)_n-SiX_3 \qquad (IV)$$

wherein in Formula IV, Y is an organofunctional group selected from the group consisting of $$-Cl, -NH_2, -SH, -CH=CH_2, -O\underset{\underset{O}{\|}}{C}-C(CH_3)=CH_2,$$

$$-N=C=O, \text{ and } CH_2\overset{O}{-}CH-;$$

X is a silicon-functional group selected from the group consisting of —Cl, —OCH$_3$, —OC$_2$H$_5$ and —OC$_2$H$_4$OCH$_3$; and n is a number in the range of about 1 to about 100; and about 1% to about 15% by weight of at least one alkoxylated alcohol represented by the formula $$HO-R^1-OR^2 \qquad (V)$$

wherein in Formula V, $R^1$ is an alkylene group of 1 to about 8 carbon atoms, and $R^2$ is a hydrocarbon group of 1 to about 6 carbon atoms.

3. The composition of claim 1 or 2 further comprising up to about 40% by weight of at least one alcohol.

4. The composition of claim 2 wherein said alcohol has from 1 to about 5 carbon atoms.

5. The composition of claim 1 or 2 further comprising up to about 10% by weight of at least one corrosion-inhibiting agent.

6. The composition of claim 5 wherein said corrosion-inhibiting agent is a perfluoro polyether.

7. The composition of claim 1 or 2 wherein said amphoteric surfactant is a compound represented by the formula $$R^2-\underset{\underset{R^3}{|}}{\overset{\overset{R^1}{|}}{N^+}}-R^4-X^- \qquad (II)$$

wherein in Formula II, $R^1$, $R^2$ and $R^3$ are independently hydrogen or hydrocarbon groups, $R^4$ is an alkylene group, and $X^-$ is $SO_3^-$ or $COO^-$.

8. An aerosol system comprising an aerosol dispenser and within said dispenser at least one aerosol propellant and the composition of claim 1 or 2.

9. A composition comprising water and the following ingredients dispersed with said water: about 2% to about 4% by weight of at least one $C_8$ to $C_{24}$ linear alcohol ethoxylate; about 0.1% to about 0.5% by weight of soya dimethylethyl ammonium etho sulfate; about 1% to about 3% by weight of a mixture containing about 75% by weight methoxy functional amino silsesquioxane, about 18% by weight octadecyl amino dimethyl trimethoxy silylpropyl ammonium chloride, about 4% by weight chloropropyl trimethoxy silane, and about 3% by weight methyl alcohol; about 2% to about 4% by weight of 2-butoxy ethanol; about 2% to about 4% by weight of isopropyl alcohol; and about 0.05% to about 0.2% by weight of perfluoro polyether.

* * * * *